United States Patent [19]

Forsyth et al.

[11] Patent Number: 5,412,787
[45] Date of Patent: May 2, 1995

[54] TWO-LEVEL TLB HAVING THE SECOND LEVEL TLB IMPLEMENTED IN CACHE TAG RAMS

[75] Inventors: Mark Forsyth; Patrick Knebel, both of Fort Collins, Colo.

[73] Assignee: Hewlett-Packard Company, Palo Alto, Calif.

[21] Appl. No.: 136,715

[22] Filed: Oct. 13, 1993

Related U.S. Application Data

[63] Continuation of Ser. No. 616,540, Nov. 21, 1990, abandoned.

[51] Int. Cl.6 .......................................... G06F 12/10
[52] U.S. Cl. .................................. 395/400; 395/425; 364/DIG. 1; 364/256.3; 364/243.41
[58] Field of Search ... 364/200 MS File, 900 MS File; 395/400, 425

[56] References Cited

U.S. PATENT DOCUMENTS

| | | | |
|---|---|---|---|
| 4,424,487 | 4/1984 | Fletcher et al. | 395/425 |
| 4,456,954 | 6/1984 | Bullions, III et al. | 395/400 |
| 4,464,712 | 8/1984 | Fletcher | 395/425 |
| 4,500,952 | 2/1985 | Heller et al. | 395/400 |
| 4,577,274 | 3/1986 | Ho et al. | 395/425 |
| 4,654,777 | 3/1987 | Nakamura | 395/400 |
| 4,686,621 | 8/1987 | Keeley et al. | 395/575 |
| 4,695,950 | 9/1987 | Brandt et al. | 395/400 |
| 4,797,814 | 1/1989 | Brenza | 395/425 |
| 4,802,085 | 1/1989 | Levy et al. | 395/375 |
| 4,811,215 | 3/1989 | Smith | 395/375 |
| 4,849,876 | 7/1989 | Ozawa et al. | 395/400 |
| 4,914,577 | 4/1990 | Stewart et al. | 395/400 |
| 4,953,073 | 8/1990 | Moussouris et al. | 395/400 |
| 4,992,936 | 2/1991 | Katada et al. | 395/400 |
| 5,003,459 | 3/1991 | Ramanujan et al. | 395/400 |
| 5,018,061 | 5/1991 | Kishigami et al. | 395/400 |
| 5,060,137 | 10/1991 | Bryg et al. | 395/250 |
| 5,113,506 | 5/1992 | Moussouris et al. | 395/400 |
| 5,133,058 | 7/1992 | Jensen | 395/400 |
| 5,307,477 | 4/1994 | Taylor et al. | 395/425 |

*Primary Examiner*—Glenn Gossage
*Assistant Examiner*—Matthew Kim

[57] ABSTRACT

A computer system implementing two levels of translation lookaside buffers (TLBs). The first-level TLBs are small, two-set associative, have a short access time and reside on the CPU chip. The second-level TLBs, on the other hand, are large, direct mapped, and reside in otherwise unused portions of the cache tag RAMs of the instruction and data cache sub-systems. As a result of this arrangement, performance may be improved without limiting the amount of available cache memory for a given implementation. Even if higher capacity memory devices are required for implementing the second-level TLBs in the cache tag RAMs in accordance with the invention, a significant savings over the cost of two sets of smaller devices would still result.

13 Claims, 3 Drawing Sheets

TWO-LEVEL TLB HAVING THE SECOND LEVEL TLB IMPLEMENTED IN CACHE TAG RAMS

This is a continuation of application Ser. No. 07/616,540 filed on Nov. 21, 1990, now abandoned.

BACKGROUND OF THE INVENTION

1. Field of the Invention

The present invention relates to a two-level translation lookaside buffer (TLB), and more particularly, to a two-level TLB having a first level TLB on the CPU and a second level TLB residing in otherwise unused portions of the cache tag RAMs.

2. Description of the Prior Art

Conventional computer processing systems frequently include a very large main memory address space that a user accesses via virtual memory addresses. These virtual memory addresses are typically converted to physical memory addresses by any of a number of techniques so that the processor can access the desired information stored in the main memory. However, since access to the main memory is often quite time consuming, many computer systems employ a cache memory for interfacing the main memory to the processor. The cache memory typically includes the memory pages and associated tags most likely to be asked for by the processor, and since the cache memory is typically small and located proximate the processor, it can be accessed much faster than the main memory. Cache memories thus help to significantly improve processing speed for typical applications.

Certain conventional cache memories comprise a high speed data Ram and a parallel high speed tag RAM. The address of each entry in the cache is generally the same as the low order portion of the main memory address to which the entry corresponds, where the high order portion of the main memory address is stored in the tag RAM as tag data. Thus, if main memory has $2^m$ blocks of $2^n$ words each, the i'th word in the cache data RAM will be a copy of the i'th word of one of the $2^m$ blocks in main memory, and the identity of that block is stored in the tag RAM. Then, when the processor requests data from memory, the low order portion of the address is supplied as an address to both the cache data and tag RAMs. The tag for the selected cache entry is compared with the high order portion of the processor's address and, if it matches, the data from the cache data RAM is enabled onto the data bus. If the tag does not match the high order portion of the processor's address, then the data is fetched from main memory. The data is also placed in the cache for potential future use, overwriting the previous entry. On a data write from the processor, either the cache RAM or main memory or both may be updated, and flags such as "data valid" and "data dirty" may be used to indicate to one device that a write has occurred in the other. The use of such a small, high speed cache in the computer design permits the use of relatively slow but inexpensive RAM for the large main memory space without sacrificing processing speed.

An address translation unit is used in conjunction with cache memories in such virtual memory systems for performing the aforementioned virtual to physical address translation. Generally, the address translation unit provides a map to the desired page of main memory, and such a map is typically stored as a page table. To increase the speed of access to entries in the page table, and hence the speed of address translation, translation lookaside buffers (TLBs) are often employed with or in place of the page tables. TLBs generally operate as caches for the page table and, when used, allow faster access to the page tables. The TLBs, as with the data caches, are typically small and may be located proximate to or actually on the processor chip. The speed of the processor can thus be improved without significantly increasing its chip area. A conventional address translation system is described, for example, by Moussouris et al in U.S. Pat. No. 4,953,073.

Most existing reduced instruction set computer (RISC) designs use only a single level TLB. However, one known design implements a second-level TLB in the cache data array in order to take advantage of the system clock frequencies available with modern VLSI technologies. For example, in the MIPS RC6280 CPU, the primary cache is split between instructions and data, is direct mapped, virtually addressed, and write through. The second level cache is unified, two-way set associative, physically addressed, and copy back. The principal tags for the second level cache are virtual, rather than physical, so as to facilitate a small on-chip TLB. The CPU chip contains the virtual address generation logic which forms the index into the primary cache, a 96-bit first level TLB which is used to form the index into the second level cache, and the cache control state machines which handle the management of the cache subsystem and memory mapping functions.

The MIPS RC6280 CPU utilizes a two-level TLB so that the address translation may be provided on-chip. The first level TLB comprises a 16-entry, 96-bit "TLB-slice" located on the CPU chip, while the second level TLB backs up the first level TLB with a 4,096-entry full TLB stored in the second level cache. The TLB-slice consists of two direct mapped tables (one for instructions, one for data) which deliver just enough bits of the physical page number to complete the second level cache index. On the other hand, the second-level TLB is disposed in a reserved section of the second level cache in order to simplify TLB miss software. However, by implementing the second-level TLB in the cache data array in this manner, the maximum amount of cache data memory available is thereby limited. Of course, this adversely affects system performance.

Accordingly, it is desired to design a two-level TLB so that address translation may be performed on-chip without limiting the maximum amount of cache data memory available. The present invention has been designed to meet this need.

SUMMARY OF THE INVENTION

The present invention relates to a processor which implements two levels of translation lookaside buffers (TLBs). Separate TLBs are provided for instructions (ITLB) and data (DTLB). The ITLB and DTLB each have first-level TLBs which are small, two-set associative, have a one-cycle access time and reside on the CPU chip. The second-level TLBs, on the other hand, are large, direct mapped, have seven-cycle access time, and reside in otherwise unused portions of the cache tag RAMs. By so combining the second-level TLBs with the cache tag RAMs, a single set of external memory devices may be used to serve both functions.

The present invention thus relates to a computer system which has a memory for storing blocks of data and processing means for providing virtual addresses of data in the memory which is to be processed. In accordance with the invention, virtual address translation is performed using a first-level translation lookaside buffer (TLB) which stores address translation information for translating the virtual addresses to physical addresses of the data in the memory, and tag memory means divided into a first area for storing data tag information corresponding to the blocks of data in the memory and a second area for storing a second-level translation lookaside buffer (TLB) having address translation information which is accessed for a virtual to physical address translation when the address translation information for making the virtual to physical address translation is not available in the first-level translation lookaside buffer.

Thus, in accordance with the invention, the second-level TLB is incorporated into unused portions of the tag memory means. Preferably, the first and second areas are one of the lower or upper half of the tag memory means such that the processing means can access the second-level TLB by specifying a most significant address bit of an address to the tag memory means which corresponds to the second area. Also, the second-level TLB is preferably direct mapped to the memory means.

In accordance with the invention, the processing means and the first-level TLB are located proximate each other on a semiconductor chip. The first-level TLB also may be two-set associative. In such an embodiment, the memory preferably comprises first and second data RAMs while the tag memory means comprises first and second tag RAMs corresponding to the first and second data RAMs. Each entry in the second-level TLB preferably occupies two data words in the second area in each of the first and second tag RAMs so as to allow parallel access. In a preferred embodiment, each entry in the second-level TLB occupies two data words of the second area in each of the first and second tag RAMs. Also, in such a preferred embodiment, the tag memory means has an addressable data size approximately one-fourth to one-half that of the memory to which it corresponds.

In accordance with another aspect of the invention, the computer system has separate TLBs for instruction and data. Such a computer system in accordance with the invention preferably comprises first memory means for storing blocks of data, second memory means for storing blocks of instruction data and processing means for providing virtual addresses of the data in the first memory means and virtual addresses of the instruction data in the second memory means. Address translation is preferably performed using a first-level data translation lookaside buffer (DTLB) for storing address translation information for translating the virtual addresses to physical addresses of the data in the first memory means and a first-level instruction translation lookaside buffer (ITLB) for storing address translation information for translating the virtual addresses to physical addresses of the instruction data in the second memory means. However, the invention is further characterized by first tag memory means divided into a first area for storing data tag information corresponding to the blocks of data in first memory means and a second area for storing a second-level data translation lookaside buffer (DTLB) having address translation information which is accessed for a virtual to physical address translation when the address translation information for making the virtual to physical address translation is not available in the first-level DTLB. The invention also includes a second tag memory means divided into a first area for storing instruction tag information corresponding to the blocks of instruction data in the second memory means and a second area for storing a second-level instruction translation lookaside buffer (ITLB) having address translation information which is accessed for a virtual to physical address translation when the address translation information for making the virtual to physical address translation is not available in the first-level ITLB.

The invention also encompasses a method of translating a virtual address output by a processor into a physical address of a memory containing blocks of data for processing by the processor. Such a method in accordance with the invention preferably comprises the steps of:

(a) providing a virtual address from the processor corresponding to a physical address of the memory at which data to be processed is stored;

(b) searching a first-level translation lookaside buffer (TLB) for particular address translation information which can be used by the processor for translating the virtual address to the physical address, and if the particular address translation information is found, performing a virtual to physical address translation;

(c) when the particular address translation information cannot be found in the first-level TLB, searching a second-level translation lookaside buffer (TLB) stored in a tag memory for the particular address translation information, and if the particular address translation is found, copying the particular address translation information to the first-level TLB and repeating step (b); and (d) when the particular address translation information cannot be found in the second-level TLB, generating a TLB miss signal and continuing processing of the processor at a TLB miss interruption vector address.

In accordance with the method of the invention, the tag memory is divided into a first area for storing data tag information corresponding to the blocks of data in the memory and a second area for storing the second-level TLB. In such a case, step (c) preferably comprises the step of specifying a most significant address bit of an address to the tag memory which corresponds to the second area. Step (c) may also comprise the step of reading at least two words in the tag memory corresponding to a single entry in the second-level TLB. In other words, since the TLB entries are typically larger than the tag entries, more than one tag RAM location may be used for storing a single TLB entry.

BRIEF DESCRIPTION OF THE DRAWINGS

The above and other objects and advantages of the invention will become more apparent and more readily appreciated from the following detailed description of the presently preferred exemplary embodiments of the invention taken in conjunction with the accompanying drawings, of which.

DETAILED DESCRIPTION OF THE PRESENTLY PREFERRED EMBODIMENT

A preferred embodiment of the invention will now be described with reference to FIGS. 1-3. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Figure 1:
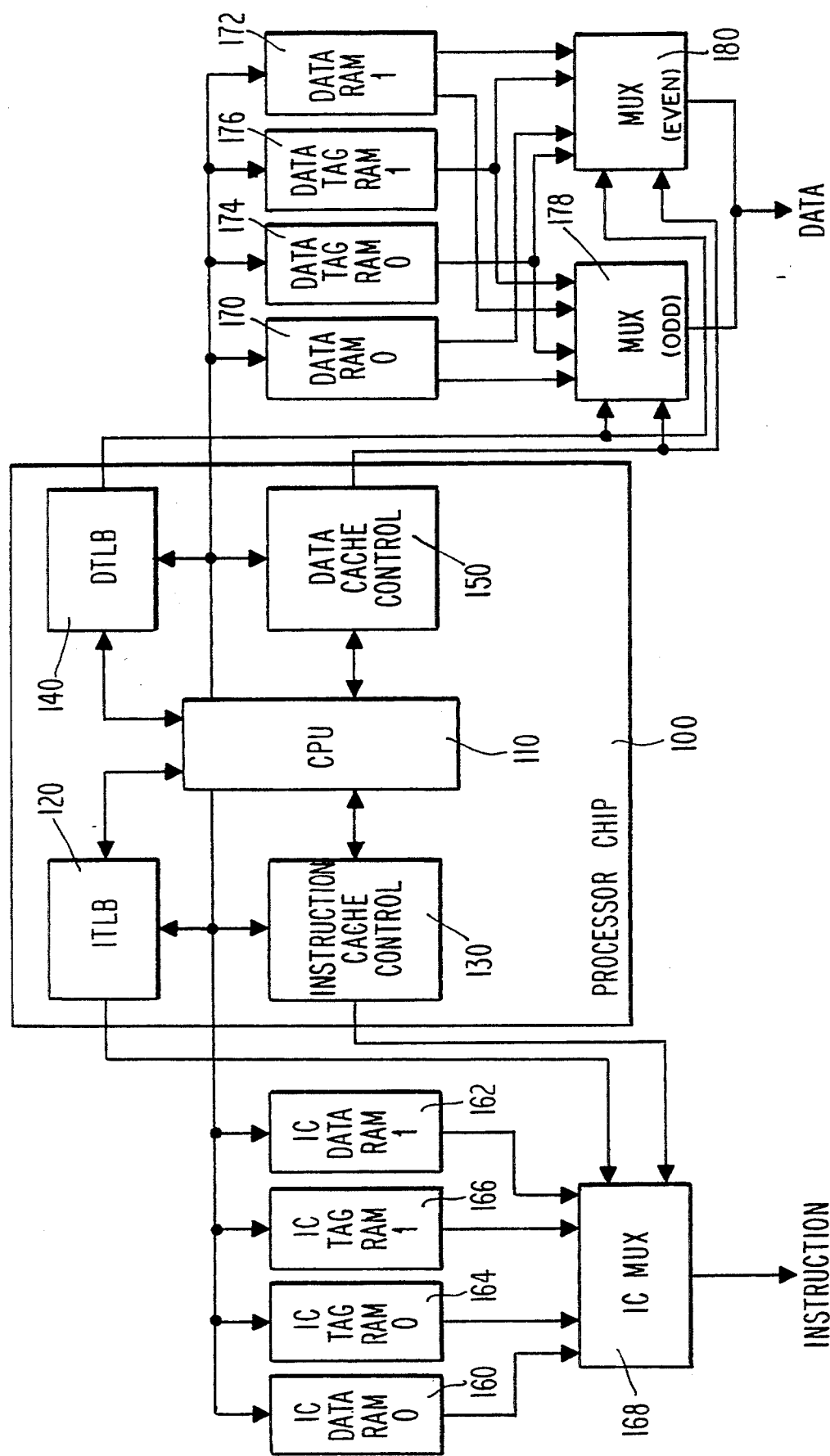
FIG. 1 illustrates a high performance processing system having separate two-level TLBs for instructions and data in accordance with the invention.

FIG. 1 illustrates a processor which implements a two-level TLB in accordance with the invention. As shown, processor chip 100 includes CPU 110, a first-level TLB for instructions (ITLB 120), instruction cache control unit 130, a separate first-level TLB for data (DTLB 140), and a data cache control unit 150. The first level TLBs ITLB 120 and DTLB 140 are preferably small, two-set associative memories having a one-cycle access time. As shown, ITLB 120 and DTLB 140 reside on the processor chip 100 with the CPU 110 and the instruction cache control unit 130 and data cache control unit 150 so as to allow on-chip address generation and translation.

As also shown in FIG. 1, the processor chip 100 communicates with an external instruction cache comprising instruction cache (IC) data RAMs 160 and 162 and IC tag RAMs 164 and 166. The outputs of these respective RAMs are provided to IC multiplexer 168 which outputs the desired instruction address in main memory under control of the output of ITLB 120 and instruction cache control unit 130. The processor chip 100 also communicates with an external data cache comprising data RAMs 170 and 172 and data tag RAMs 174 and 176. The outputs of the respective RAMs are multiplexed in odd address multiplexer 178 and even address multiplexer 180 under control of DTLB 140 and data cache control unit 150 so as to provide the desired data address to the main memory.

The data cache/address translation system of FIG. 1 generally functions as follows. CPU 100 outputs a virtual address corresponding to a physical address of data in the main memory which is desired for that processing step. The virtual address is then converted to a physical address using the two-level TLBs of the invention. For the vast majority of instruction and data accesses, the needed virtual address translation information will reside in the first-level TLB (ITLB 120 or DTLB 140) and can be accessed with no processing or pipeline penalties. When the needed translation does not exist in the first-level TLB, however, CPU 110 stalls the pipeline and accesses the second-level TLBs. If the translation exists in the second-level TLB, it will copied to the appropriate first-level TLB, ITLB 120 or DTLB 140, and instruction execution by CPU 110 will continue. However, if the translation does not exist in the second-level TLB either, execution will continue at the appropriate TLB-miss interruption vector address in accordance with known techniques. By providing a first-level TLB that can be accessed with no penalty and by only accessing the second-level TLB in the case of a first-level TLB miss, a high percentage of code can run on CPU 110 with no TLB penalty. Also, by making the first-level TLB two-set associative, many applications may be prevented from thrashing when addresses map to the same TLB location. Moreover, since the first-level TLBs are small, they may be placed on the processor chip 100 and accessed very quickly. On the other hand, by providing a large second-level TLB that can be accessed directly (such as through direct mapping), the second level TLB can be accessed with very few penalty cycles (7 penalty cycles in a preferred embodiment), and as a result, a very high TLB hit rate can be maintained and system degradation due to TLB misses kept very small even in applications that require many TLB entries.

The implementation of such a two-level TLB in the processor of the invention is distinguished in that the second-level TLB is kept in a normally unused portion of the cache tag RAMs 164 and 166 for the instruction data and cache tag RAMs 174 and 176 for the data. Thus, in accordance with the invention, the second-level TLB is not placed in data RAMs 160, 162 or 170, 172 as proposed in the aforementioned prior art. Rather, the present inventors have discovered that the second-level TLBs may be more advantageously placed in otherwise unused portions of the cache tag RAMs 164, 166 or 174, 176. As known by those skilled in the art, these tag RAMs typically hold physical address information and various flags, such as "valid" flags, "dirty" flags, and "shared bit" flags. Since the tag RAMs typically do not use a large amount of memory space compared to their corresponding data RAMs, a sufficient amount of memory space is typically left over to allow the second-level TLBs to be incorporated therein as proposed by the present inventors without performance degradation caused by limiting the amount of maximum data cache memory area as in the prior art device discussed above.

Figure 2:
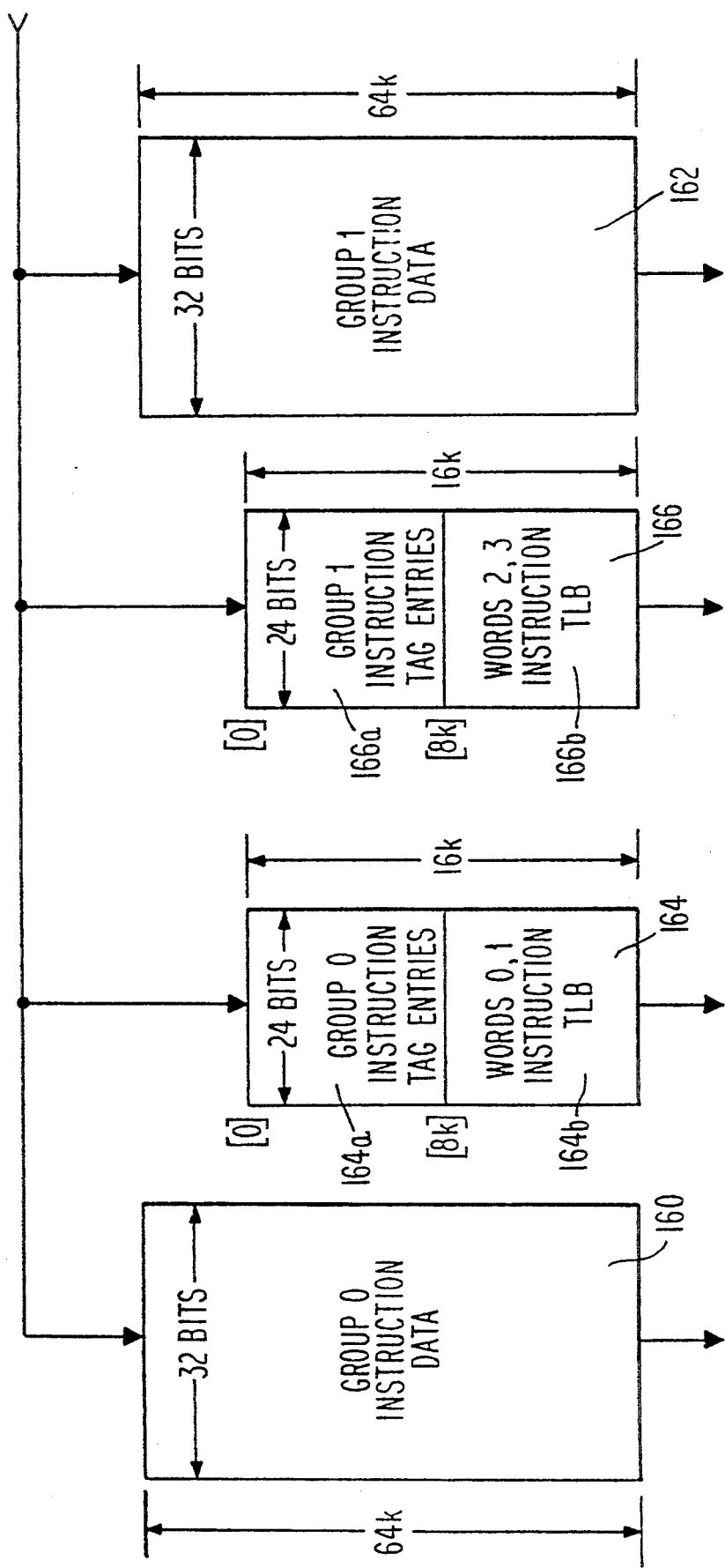
FIG. 2 illustrates the implementation of the second-level TLB in accordance with the invention.

For example, as shown in FIG. 2, the IC data RAM entries are typically organized into blocks so that each block of data requires only one entry in the corresponding tag RAMs. Thus, if the same depth RAMs are used for data and tag entries, and if each block consists of more than one data entry, then there will be unused portions of the tag RAMs. Typically, even when the depth of the tag RAMs is smaller than the depth of the corresponding data RAMS, portions of the tag RAMs are still typically unused.

In the example illustrated in FIG. 2, the instruction cache data RAMs 160 and 162 are 256-kbyte RAMs organized into 4-byte (32 bit) word entries and 8k of 32-byte blocks. Thus, if eight "64k by 4" RAM parts are used to realize the 256-kbyte instruction cache, then 8k tag entries are needed. In other words, one entry is put into the tag RAMs 164a and 166a for each 32 byte block of instruction data in IC data RAMs 160 and 162. Accordingly, even if a "16k by 4k" RAM is used for the tag RAMs 164 and 166, then only half of the tag depth is needed for the instruction tag entries. The remainder of the IC tag RAMs 164 and 166 may hence be used for the second-level instruction TLBs 164b and 166b in accordance with the invention without giving up otherwise used cache memory space. In other words, the unneeded portion of IC tag RAMs 164 and 166 may be used to hold the second-level TLB entries without processor performance penalty.

In accordance with the invention, CPU 110 logically splits the tag RAMs 164, 166 and 174, 176 into two portions by using an address pin to select either the cache tag half (164a, 166a) or the TLB half (164b, 166b) for access. This may be simply done by toggling the most significant bit of the address to the cache tag RAMs 164 or 166 during access. However, because most TLB entries are typically much wider than tag entries, processor 110 must read more than one address of the second-level TLB 164b, 166b for each TLB entry. For example, each tag entry may have 24 bits, where 21 are address bits (for a memory with $2^{21}$ pages) and three are the aforementioned flags. TLB entries, on the other hand, are generally on the order of 88 bits for such a system and hence require four 24-bit tag word entries (4 words by 24 bits each) for each second-level TLB entry. Thus, in such a case it is necessary for one TLB entry to occupy four entries of the cache tag RAMs 164, 166.

Figure 3:
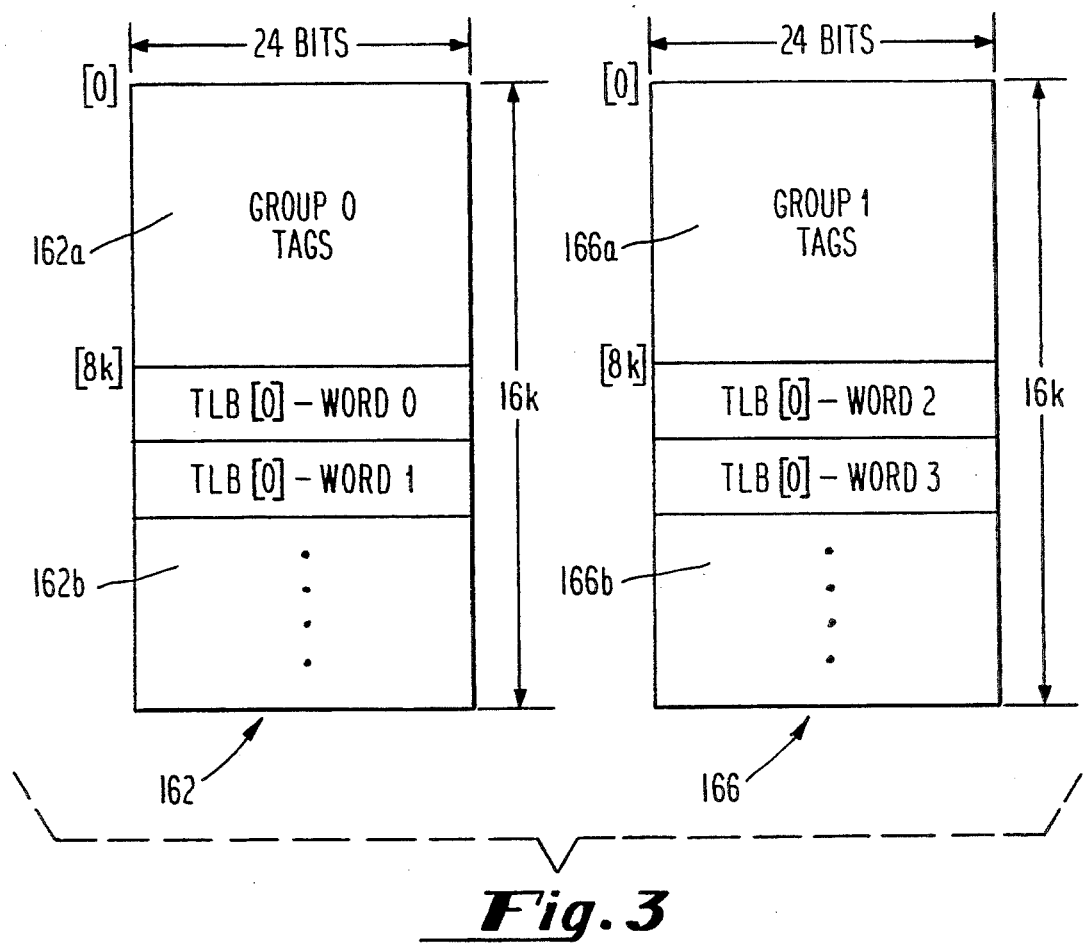
FIG. 3 illustrates the technique by which TLB entries are stored in the two-set associative cache data tag RAMs in accordance with the invention.

FIG. 3 shows the instruction cache tag RAMs 164 and 166 in more detail. As noted above, since CPU 110 implements two-set associative caches, there are two instruction cache tag RAMs. When such two-set associative caches are used, each TLB entry preferably takes up two consecutive words in each TLB cache for a total of four words. In other words, each second-level TLB entry comprises four words, two in each IC tag RAM, so that four reads must be split over the two associative IC tag RAMs 164, 166 for the TLB entries to be accessed. Preferably, both of the TLB caches 164 and 166 are read simultaneously by CPU 110 so that only two reads are necessary for accessing each TLB entry. Thus, when the second-level TLB is accessed by CPU 110 for an address translation, CPU 110 specifies the MSB of the address to the tag RAM as that of the second-level TLB, thereby ignoring the instruction tag entries 164a, 166a, and if the desired address translation entry is found, that entry may be copied to the first-level TLB with two reads so that processing may then continue.

Although only the IC tag RAMs 164, 166 have been described with reference to FIGS. 2 and 3, it should be apparent to one skilled in the art that the same techniques may be used for implementing the second-level TLB in the data tag RAMs 174 and 176. Best results are achieved in accordance with the invention when the tag RAMs have approximately ¼ to ½ the number of entries as the data RAMs. For the example given above, each of the second-level TLBs 164B and 166B have 8k of addressable space; therefore, 4k entries (16k words divided by 4 words per entry) are available in the second-level TLB, which is sufficient for most purposes.

The design of the present invention thus has two major advantages over existing methods having separate RAMs for implementing off-chip TLBs. The first advantage is the ability to implement the external second-level TLB memory arrays using only a small number of additional signal pads/pins on the processor chip 100. Reduced pin count can be translated to reduced package cost or higher performance due to utilization of more pins for other performance enhancing features. Maximum pin count limits on integrated circuit devices are a reality of technological limitations and are difficult to exceed without large expenses and technological risks. The second advantage is reduced cost for a given level of performance. By combining the second-level TLBs with existing cache tags, a single set of external memory devices may be used for both purposes. Even if higher capacity memory devices are required than would ordinarily be required for the cache tag function alone, there is still a significant savings over the cost of two sets of smaller devices. The design also results in reduced system power, PC board area requirements, reduced PC board routing complexity, and reduced power and area for circuits on the processor chip 100.

Those skilled in the art will readily appreciate that many modifications to the invention are possible within the scope of the invention. For example, data RAMs and tag RAMs of varying sizes may be used in accordance with the amount of space available or the budget for memory. Any such arrangement is possible so long as extra memory space is available in the tag RAMs for storing the second-level cache of the invention, which is usually the case for the reasons noted herein. Accordingly, the scope of the invention is not intended to be limited by the preferred embodiment described above, but only by the appended claims.

We claim:

1. A computer system comprising:

first memory means for storing blocks of data;

second memory means for storing blocks of instruction data;

a first-level data translation lookaside buffer (DTLB) for storing address translation information for use in translating virtual addresses to physical addresses of said blocks of data stored in said first memory means;

a first-level instruction translation lookaside buffer (ITLB) for storing address translation information for use in translating virtual addresses to physical addresses of said blocks of instruction data stored in said second memory means;

first tag memory means divided into a first area for storing data tag information corresponding to said blocks of data in said first memory means and a second area for storing a second-level data translation lookaside buffer (DTLB) for storing address translation information for use in translating virtual addresses to physical addresses of said blocks of data stored in said first memory means;

second tag memory means divided into a first area for storing data tag information corresponding to said blocks of instruction data in said second memory means and a second area for storing a second-level instruction translation lookaside buffer (ITLB) for storing address translation information for use in translating virtual addresses to physical addresses of said blocks of instruction data stored in said second memory means; and processing means for (1) providing a virtual address of one of data stored in said first memory means and of instruction data stored in said second memory means, (2) when a virtual address of data stored in said first memory means is provided, searching said first-level DTLB for address translation information for said virtual address of data stored in said first memory means and translating said virtual address of data stored in said first memory means to a physical address of a corresponding block of data stored in said first memory means if said address translation information for said virtual address of data stored in said first memory means is found in said first-level DTLB, else searching said first-level ITLB for address translation information for said virtual address of instruction data stored in said second memory means and translating said virtual address of instruction data stored in said second memory means to a physical address of a corresponding block of instruction data stored in said second memory means if said address translation information for said virtual address of instruction data stored in said second memory means is found in said first-level ITLB, (3) when a virtual address of data stored in said first memory means is provided and said address translation information for said virtual address of data stored in said first memory means is not found in said first-level DTLB, searching said second-level DTLB stored in said first tag memory means for address translation information for said virtual address of data stored in said first memory means and translating said virtual address of data stored in said first memory means to said physical address of said corresponding block of data stored in said first memory means if said address translation information for said virtual address of data stored in said first memory means is found in said second-level DTLB, else when said address translation information for said virtual address of data stored in said first memory means is not found in said first-level ITLB, searching said second-level ITLB stored in said second tag memory means for address translation information for said virtual address of instruction data stored in said second memory means and translating said virtual address of instruction data stored in said second memory means to said physical address of said corresponding block of instruction data stored in said second memory means if said address translation information for said virtual address of instruction data stored in said second memory means is found in said second-level ITLB, and (4) when said processor has completed a virtual address to physical address translation, accessing one of said first memory means and said second memory means at the physical address of one of said corresponding block of data stored in said first memory means and said corresponding block of instruction data stored in said second memory means.

2. A method of translating a virtual address output by a processor into a physical address of a memory containing blocks of data to be processed by said processor, comprising the steps of:
   (a) providing a virtual address from said processor corresponding to said physical address of said memory where data to be processed is stored;
   (b) searching a first-level translation lookaside buffer (TLB) for address translation information for said virtual address and translating said virtual address to said physical address if said address translation information for said virtual address is found in said first-level TLB;
   (c) when said address translation information for said virtual address is not found in said first-level TLB, searching a second-level translation lookaside buffer (TLB) stored in a tag memory for said address translation information for said virtual address, and if said address translation information for said virtual address is found in said second-level TLB, copying said address translation information found in said second-level TLB to said first-level TLB and repeating step (b); and
   (d) when said address translation information is not found in said second-level TLB, generating a TLB miss signal and continuing processing by said processor at a TLB miss interruption vector address.

3. The method of translating as in claim 2, comprising the steps of dividing said tag memory into a first area comprising a portion of said tag memory having a most significant address bit of a first value and a second area comprising a portion of said tag memory having a most significant address bit of a second value and storing data tag information corresponding to said blocks of data in said memory in said first area and said second-level TLB in said second area.

4. The method of translating as in claim 3, wherein step (c) comprises the step of accessing said second-level TLB by addressing said tag memory with an address having a most significant address bit of said second value.

5. The method of translating as in claim 2, wherein step (c) comprises the step of simultaneously reading at least two data words in said second area of said tag memory during said searching of said second-level TLB.

6. A computer system comprising:
   memory means for storing blocks of data;
   a first-level translation lookaside buffer (TLB) for storing address translation information for use in translating virtual addresses to physical addresses of said blocks of data stored in said memory means;
   tag memory means divided into a first area for storing data tag information corresponding to said blocks of data in said memory means and a second area for storing a second-level translation lookaside buffer (TLB) for storing address translation information for use in translating virtual addresses to physical addresses of said blocks of data stored in said memory means; and
   processing means for (1) providing a virtual address of data stored in said memory means, (2) searching said first-level translation lookaside buffer for address translation information for said virtual address and translating said virtual address to a physical address of a corresponding block of data stored in said memory means if said address translation information for said virtual address is found in said first-level translation lookaside buffer, (3) when said address translation information for said virtual address is not found in said first-level translation lookaside buffer, searching said second-level translation lookaside buffer stored in said tag memory means for address translation information for said virtual address and translating said virtual address to said physical address of said corresponding block of data stored in said memory means if said address translation information for said virtual address is found in said second-level translation lookaside buffer, and (4) when said processor has completed said virtual address to physical address translation, accessing said memory means at said physical address.

7. The computer system as in claim 6, wherein said processing means and said first-level TLB are located proximate each other on a semiconductor chip.

8. The computer system as in claim 6, wherein said first area comprises a portion of said tag memory means having a most significant address bit of a first value and said second area comprises a portion of said tag memory means having a most significant address bit of a second value, said processing means accessing said second-level TLB by addressing said tag memory means with an address having said most significant address bit of said second value.

9. The computer system as in claim 6, wherein said second-level TLB is direct mapped to said memory means.

10. The computer system as in claim 6, wherein said first-level TLB is two-set associative.

11. The computer system as in claim 10, wherein said memory means comprises first and second data RAMs and said tag memory means comprises first and second tag RAMs corresponding to said first and second data RAMs, respective portions of address translation information for each virtual address being respectively stored in said second area of said first and second tag RAMs so as to allow said processing means to simultaneously access said respective portions of said address translation information for each virtual address.

12. The computer system as in claim 11, wherein said address translation information for each virtual address occupies two data words of said second area in each of said first and second tag RAMs.

13. The computer system as in claim 6, wherein said tag memory means has an addressable data size approximately one-fourth to one-half an addressable data size of said memory means.

* * * * *